(12) United States Patent
Lee et al.

(10) Patent No.: US 6,424,456 B1
(45) Date of Patent: Jul. 23, 2002

(54) OPTICAL FIBER AMPLIFIER FOR CLAMPING AND EQUALIZING GAIN IN OPTICAL COMMUNICATION SYSTEM

(75) Inventors: Donghan Lee, Daejeon-si; Hyunbeom Choi, Gyonggi-do, both of (KR)

(73) Assignee: Neotek Research Co., Ltd., Seoul (KR)

( * ) Notice: Subject to any disclaimer, the term of this patent is extended or adjusted under 35 U.S.C. 154(b) by 0 days.

(21) Appl. No.: 09/852,766

(22) Filed: May 11, 2001

(51) Int. Cl.[7] .................................................. H01S 3/00
(52) U.S. Cl. ..................................... 359/337; 359/337.4
(58) Field of Search ............................. 359/337, 337.11, 359/337.4

(56) References Cited

U.S. PATENT DOCUMENTS

| | | | | |
|---|---|---|---|---|
| 5,239,607 A | * | 8/1993 | da Silva et al. | 385/122 |
| 6,008,932 A | * | 12/1999 | Luo et al. | 359/337 |
| 6,175,436 B1 | * | 1/2001 | Jackel | 359/179 |
| 6,307,667 B1 | * | 10/2001 | Liang | 359/337 |

FOREIGN PATENT DOCUMENTS

| | | | |
|---|---|---|---|
| EP | 07796689 A2 | * | 6/1997 |
| JP | 2000-294860 | * | 10/2000 |

* cited by examiner

Primary Examiner—Mark Hellner
(74) Attorney, Agent, or Firm—Greenblum & Bernstein, P.L.C.

(57) ABSTRACT

The present invention is to provide an optical fiber amplifier for clamping and equalizing gain in optical communication systems comprising: a gain clamping amplifier unit for clamping the gain, so as to make input signals have the same output power for each channel by applying a compensating signal; a second isolator for passing the input signal light from said gain clamping amplifier unit and isolating the light coming from the opposite direction; a gain equalizing filter for equalizing the output gain spectrum from the input signal from said second isolator; and a post-amplifier unit for amplifying the signal from said gain equalizing filter. Thus, the optical fiber amplifier is capable of clamping gain automatically by maintaining the same population inversion, and capable of maintaining the same gain equalization for the wide signal gain band to achieve the high transmission capacity, in cases that the number of channel varies in the input signal, while providing a high output signal power.

12 Claims, 4 Drawing Sheets

OPTICAL FIBER AMPLIFIER FOR CLAMPING AND EQUALIZING GAIN IN OPTICAL COMMUNICATION SYSTEM

FIELD OF THE INVENTION

The present invention relates to an optical fiber amplifier for clamping and equalizing gain in optical communication systems, and particularly to an optical fiber amplifier for clamping and equalizing gain, capable of clamping gain automatically by maintaining the same population inversion, and capable of maintaining the same gain equalization for the wide signal gain band to achieve the high transmission capacity, in the case that the number of channel varies in the input signal.

BACKGROUND OF THE INVENTION

Generally, in optical communication systems, an optical amplifier is used to compensate loss in a signal. Such an optical amplifier is a device for compensating loss of attenuation of the optical signal due to a long distance transmission.

Optical fiber amplifiers are widely used in optical communication systems. Especially, an erbium doped fiber amplifier (EDFA) is used to amplify a signal periodically in certain distance so as to compensate the attenuation of optical signal caused by the long distance transmission, when a great number of data are transmitted over long distance, without being regenerated through a strand of optical fiber.

If the wavelength division multiplexing (WDM) optical transmission system is used, the whole transmission capacity increases rapidly in proportion to the number of wavelengths used, since a number of data can be transmitted on many carriers of different wavelength each other.

In the WDM network, changes in the number of channels frequently occur on account of changes in network configuration, malfunctions in constituent elements, and frequent add/drops of channels. Change of the total power in the input signal associated with the above change can induce a gain change and a transient to the output of the remaining optical channels. As a result, transmission errors can increase due to the above mentioned gain variations. Accordingly, in WDM networks, the gain variation on account of a change of the number of input signal must be minimized.

There are two typical methods in automatic gain clamping for an optical fiber amplifier. One method is by adjusting the pumping light power and the other is by applying a compensating signal. Recent studies on all-optical automatic gain clamping methods show the relatively low output power and the equalized gain band of approximately 16nm.

However, recent trends are to employ more than 32 channels and the total output power should be considerably high in proportion to the number of channels, since the signal power at each channel is almost the same. In this case, the sufficient output power cannot be produced with existing configurations of gain-clamped optical fiber amplifier. In addition, since the equalized gain band must be sufficiently wide and the equalizing degree must be quite good for long distance transmissions, a gain-equalizing filter is inevitably required. Since the amplifier can be used in WDM networks, only after solving such problems simultaneously, the development of such an amplifier is very important. The present invention provides an optical fiber amplifier with a simple and reliable configuration capable of solving such problems.

FIG. 1 is a block diagram showing an optical fiber amplifier for clamping and equalizing gain of a prior art.

As shown in FIG. 1, the amplifier comprises: a first isolator 21 for passing the input signal light only in one direction; a first optical coupler 11 for coupling the outputs of the first isolator 21 and a filter 31; a pump 71 for producing the population inversion in an amplifying medium (EDF) 41 by increasing the pump power; a second optical coupler 12 for coupling the outputs the first optical coupler and the pump 71; an amplifying medium 41 for amplifying the input signal from the second optical coupler 12; a second isolator 22 for blocking the reflected light and passing the transmitted light in the output from the amplifying medium 41; a third optical coupler 13 for allotting the output of the second isolator 22; a third isolator 23 for isolating the allotted signals at the third optical coupler 13; a filter 31 for passing only a specified wavelength among the output from the third isolator 23 and transmitting it to the first optical coupler 11; and a fourth isolator 24 for isolating the allotted signals at the third optical coupler 13 after inputting it, and outputting the amplified optical signal, in conjunction with a compensating signal.

As mentioned above, the construction of the optical fiber amplifier of FIG. 1 is for applying a compensating signal.

That is, an amplifying medium for amplifying the input signal from a second optical coupler 12, a pump to provide the population inversion in the amplifying medium 41, two optical couplers 11, 13 of the ring shaped construction for applying a compensating signal, and a filter 31 to transmit only a specified wavelength are included in the optical fiber amplifier for clamping gain of the prior art.

The gain of the optical fiber amplifier for clamping and equalizing gain of the prior art is determined by the losses of two ring shaped couplers 11, 13. When the power of the pump 71 is increased to increase the output signal power, only the laser signal used as a compensating signal is amplified without changing the power of the amplified signal output. Also, the output power will be decreased due to the loss of the third optical coupler 13.

Eventually, the optical fiber amplifier for clamping gain of the prior art shown in FIG. 1 cannot be applied to the WDM system because the equalization of gain is not considered.

FIG. 2 is a block diagram showing an optical fiber amplifier of another example of a prior art that adds a gain equalizing filter to the output part of the optical fiber amplifier in FIG. 1.

As shown in FIG. 2, the amplifier comprises: a first isolator 21 for passing the input signal light only in one direction; a first optical coupler 11 for coupling the outputs of the first isolator 21 and a filter 31; a pump 71 for producing the population inversion in an amplifying medium (EDF) 41 by increasing the pump power; a second optical coupler 12 for coupling the outputs the first optical coupler and the pump 71; an amplifying medium 41 for amplifying the input signal from the second optical coupler 12; a second isolator 22 for blocking the reflected light and passing the transmitted light in the output from the amplifying medium 41; a third optical coupler 13 for allotting the output of the second isolator 22; a third isolator 23 for isolating the allotted signals at the third optical coupler 13; a filter 31 for passing only a specified wavelength among the output from the third isolator 23 and transmitting it to the first optical coupler 11; a gain equalizing filter 51 for equalizing the gain of the output of the allotted signal from the third optical coupler 13; and a fourth isolator 24 for isolating the output of the gain equalizing isolator 51, and outputting the optical signal with an additional compensating signal.

The optical fiber amplifier including a gain equalizing filter of a prior art as shown in FIG. 2 simply equalizes and clamps the gain by providing the gain equalizing filter at the output terminals of the optical fiber amplifier.

According to the construction of FIG. 2, an equalized gain band of approximately 30 nm can be obtained from 1530–1560 nm.

However, in the case of the optical fiber amplifier including a gain-equalizing filter, there is a problem of the relatively large loss for the output of the signal since the filter is located at the output terminals.

FIG. 3 is a block diagram showing an optical fiber amplifier of still another example of a prior art.

As shown if FIG. 3, the amplifier comprises: a first isolator 21 for passing the input signal light and isolating the light coming from the opposite direction; a first pump 71 for producing the population inversion in an amplifying medium 41 by increasing the pump power; a second optical coupler 12 for coupling the outputs of the first isolator 21 and the first pump 71; a first amplifying medium 41 for amplifying the input signal from the second optical coupler 12; a second isolator 22 for isolating the output from the first amplifying medium 41; a gain equalizing filter 51 for equalizing the gain of the input signal from the second isolator 22; a second pump 72 for producing the population inversion in a second amplifying medium 42 by increasing the pump power; a third optical coupler 13 for coupling the outputs of the gain equalizing filter 51 and the second pump 72; a second amplifying medium 42 for amplifying the input signal from the third optical coupler 13; and a fourth isolator 24 for isolating the output of the second amplifying medium 42 and outputting the signal of the equalized gain.

Thus, in such an optical fiber amplifier for equalizing gain, by providing a gain-equalizing filter 51 between the first and the second amplifying stages, an equalized gain of more than 30 nm and high output can be obtained.

FIG. 4 is a block diagram showing an optical fiber amplifier for clamping gain, combined with the optical fiber amplifier for equalizing gain of FIG. 3.

As shown in FIG. 4, the amplifier comprises: a first isolator 21 for passing the input signal light and isolating the light coming from the opposite direction; a first optical coupler 11 for coupling the outputs of the first isolator 21 and a filter 31; a first pump 71 for producing the population inversion in an amplifying medium 41 by increasing the pump power; a second optical coupler 12 for coupling the outputs of the first coupler 11 and the first pump 71; a first amplifying medium 41 for amplifying the input signal from the second optical coupler 12; a second isolator 22 for isolating the output from the first amplifying medium 41; a gain equalizing filter 51 for equalizing the gain of the input signal from the second isolator 22; a second pump 72 for producing the population inversion in a second amplifying medium 42 by increasing the pump power; a third optical coupler 13 for coupling the outputs of the gain equalizing filter 51 and the second pump 72; a second amplifying medium 42 for amplifying the input signal from the third optical coupler 13; and a fourth optical coupler 14 for allotting the optical output signals from the second amplifying medium 42; a third isolator 23 for isolating the output of the fourth optical coupler 14; a filter 31 for passing light of only a specified wavelength from the third isolator 23 and transmitting it to the first optical coupler 11; and a fourth isolator 24 for isolating the output of the fourth optical coupler 14 and outputting the signal of the clamped and equalized gain.

The optical fiber amplifier for clamping gain of FIG. 4, in combination of the idea in an optical fiber amplifier for equalizing gain can obtain the equalized and clamped gain with relatively high output power, since the two stages of construction is provided with a gain equalizing filter 51 between two stages.

However, there is the same problem as in the case of FIG. 1. That is, a high output power is difficult to obtain as the fourth optical coupler 14 is provided at the output terminal and acts as a loss provider.

As described above, in the optical fiber amplifier of prior arts or the optical fiber amplifier combined with two technologies above mentioned, it is difficult in obtaining a sufficient gain-clamped and gain-flattened output power since the obtainable clamped gain is limited. Also, as a filter is provided after the last stage of the amplifier to equalize gain, there are a problem of a decreased gain and an increased output power.

In an optical fiber amplifier for clamping gain, no results have been reported to obtain a gain band of more than 30nm. And even in the modified examples that employed the extension of the ideas, there is still a difficulty in obtaining good characteristics.

At present, the number of wavelength channels is growing to increase the transmission capacity, and a wide gain band of more than 30 nm has already been used in the long distance transmission systems. However, so far the optical fiber amplifier for WDM network systems has not been developed to satisfy the high output power with gain clamping and gain flattening, in the case of variations in the number of channels.

SUMMERY OF THE INVENTION

Accordingly, the present invention is made to solve the problems above mentioned, and an object of the present invention is to provide an optical fiber amplifier for clamping and equalizing gain in the optical communication system, capable of clamping gain automatically by maintaining the same population inversion, and capable of maintaining the same gain equalization for the wide signal gain band to achieve the high transmission capacity, in the cases that the number of channel varies in the input signal.

Another object of the present invention is to provide an optical fiber amplifier for clamping and equalizing gain, which can supply a high output power required for many WDM systems, while clamping gain for each channel and providing the equalized gain band width of more than 30nm.

Next, the construction of the optical fiber amplifier for clamping and equalizing gain in optical communication systems of the present invention will be described with the attached drawings.

FIG. 5 is a block diagram showing the optical fiber amplifier for clamping and equalizing gain in optical communication systems of the present invention.

As shown in FIG. 5, the optical fiber amplifier for clamping and equalizing gain in optical communication systems comprises: a gain clamping amplifier unit 100 for clamping gain, so as to make input signals have the same output for each channel by inputting optical signal and applying a compensating signal; a second isolator 22 for passing the signal light input from said gain clamping amplifier unit 100 and blocking the light coming from the opposite direction; a gain equalizing filter 51 for equalizing the output gain spectrum from the input signal from said second isolator 22; and a post-amplifier unit 200 for amplifying the signal from said gain equalizing filter 51.

Said gain clamping amplifier unit 100 inputs a compensating signal by a ring laser constructed by connecting both ends of an amplifying medium.

Alternatively, said gain clamping amplifier unit 100 applies a compensating signal by constructing a laser resonator using a FBG (Fiber Bragg Grating) pair.

Otherwise, said gain clamping amplifier unit 100 applies a compensating signal by using an additional LD (laser diode).

Said gain equalizing filter 51 is constructed by considering the gain characteristics of said gain clamping amplifier unit 100 and post-amplifier unit 200.

Said post-amplifier unit 200 is made up of a pumping configuration in the forward direction so that a high output power can be obtained.

Alternatively, said post-amplifier unit 200 is made up of a pumping configuration in the backward direction so that a high output power can be obtained.

Otherwise, said post-amplifier unit 200 is made up of a pumping configuration in both directions so that a high output power can be obtained.

FIG. 6 is a detailed diagram of FIG. 5.

As shown in FIG. 6, said gain clamping amplifier unit 100 includes: a first pump 71 for producing the population inversion in an amplifying medium 41 by increasing the pump power; a first optical coupler 11 for coupling said input signal and the output of said first pump 71; a first amplifying medium (EDF1) 41 for amplifying the input signal from said first optical coupler 11; and a laser resonator system for producing a compensating signal and thus clamping the gain of the first stage.

Said gain clamping amplifier unit 100 further includes a first isolator 21 for passing the input signal light and blocking the light coming from the opposite direction.

Said post-amplifier unit 200 includes: a second pump 72 and a third pump 73 for producing the population inversion in a second amplifying medium 42 by increasing the pump power; a second optical coupler 12 for coupling the outputs from said gain equalizing filter 51 and said second pump 72; a second amplifying medium (EDF2) 42 for amplifying the input signal from said second optical coupler 12; and a third optical coupler 13 for coupling the outputs from said second amplifying medium 42 and said third pump 73.

Said post-amplifier unit 200 further includes a third isolator 23 for isolating the output from said third optical coupler 13 and outputting the gain clamped and equalized signal.

DETAILED DESCRIPTION OF THE EMBODIMENTS

The present invention will be described in more detail with reference to the preferred embodiment shown in the attached drawings.

As described above, channels are growing in number to increase transmission capacity, and a wide gain band of more than 30 nm has already been used in long distance transmission systems, but optical fiber amplifiers for use in WDM network systems have not been developed yet satisfactorily for the case of channel variations in the input signal.

Figure 5:
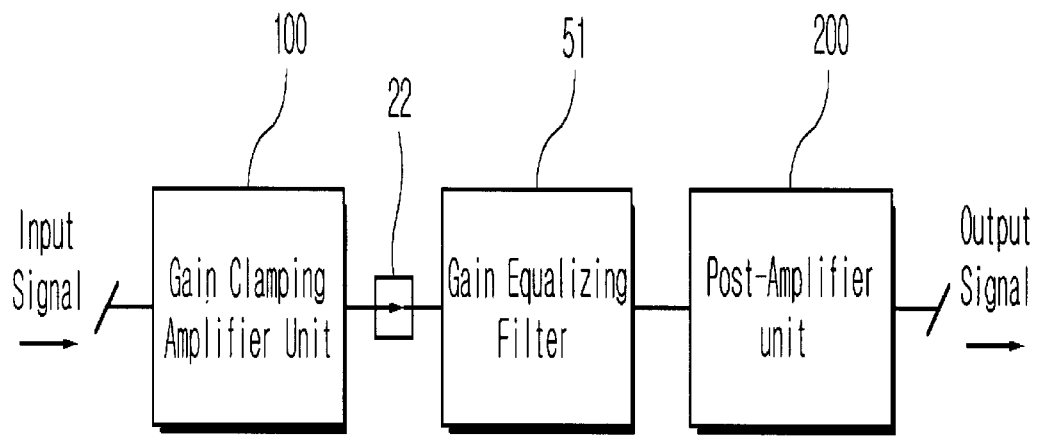
FIG. 5 is a block diagram showing in optical communication systems of the present invention.
Figure 6:
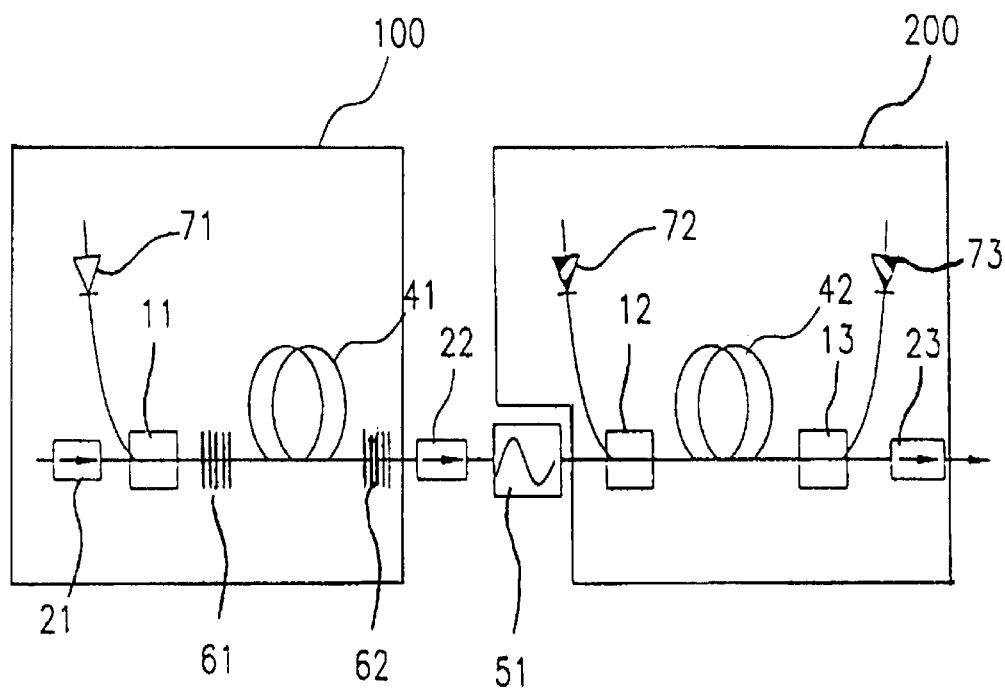
FIG. 6 is an example of an optical fiber amplifier for clamping and equalizing gain, with a detailed diagram, of FIG. 5.

FIG. 5 is a block diagram showing an optical fiber amplifier for clamping and equalizing gain in optical communication system of the present invention, and FIG. 6 is a detailed diagram of an example of the amplifier of FIG. 5.

The present invention is mainly made up of a gain clamping amplifier unit 100, a gain equalizing filter 51, and a post-amplifier unit 200.

The gain clamping amplifier unit 100 includes a first optical coupler 11 for coupling input optical signals, a first amplifying medium 41 for amplifying and outputting the signals from the first optical coupler 11, and a first pump 71 for producing the population inversion in an amplifying medium 41 by increasing the pump power, and is made up of FBG 61, 62 constituting a laser resonator to supply a compensating signal.

The signal amplified in the gain clamping amplifier unit 100 is the signal input to the post-amplifier unit 200, i.e. the second amplifying stage, via a second isolator 22 and a gain-equalizing filter 51, with the modification of the gain spectrum due to the second isolator 22 and a gain-equalizing filter 51.

The post-amplifier unit 200 includes a second optical coupler 12, an amplifying medium 42 and pumps 72, 73, and outputs the amplified signal a sufficient gain.

In designing a gain equalizing filter 51 in the middle stage, the gain characteristics of the gain clamping amplifier unit 100, i.e. the first amplifying stage, and post-amplifier unit 200, i. e. the second amplifying stage, must be considered.

According to the present invention, in WDM networks, a constant amplifying gain can be obtained even if there are changes in input signal power due to the variations in the number of channels, while maintaining the equalized gain spectrum.

That is, at the gain clamping amplifier unit 100, the gain is clamped by using the methods of applying a compensating signal. In this case, the population inversion in the amplifying stage is kept constant because of the compensating signal. As a result, the gain for each channel is constant, and the whole output power including the compensating signal is also constant, even if the number of channels changes.

In this case, the signal transmitted to the gain equalizing filter 51 in the middle stage has the fixed output power and the fixed gain spectrum. The gain-equalizing filter 51 should be designed to provide the equalized output gain spectrum after the post-amplifier unit 200, by considering the gain characteristics of the first and the second amplifying stages. The signal output from a gain-equalizing filter 51, i.e. the input signal to the post-amplifier unit 200, has the same power and the same gain spectrum even if the number of channels changes, after the fixed gain-equalizing filter 51.

Thus, the second amplifier unit 200 can amplify fully, without any additional losses, the input signal and then the signal for each channel will have the same output power.

One of the key mechanisms of the present invention is that the power and the gain profile of the input signal to the post-amplifying stage, the main amplifying stage, are kept the same and then the output after the post-amplifying stage 200 should have the same gain characteristics, even if the number of channels changes. So the post-amplifying stage 200 can be optimized for the high output power for more wavelength channels. In addition, the gain-equalizing filter 51 is located in the middle of two amplifying stage to give high output power. So the amplifier of the present invention is optimized for the highest output power, while maintaining gain clamping and gain equalization.

Figure 1:
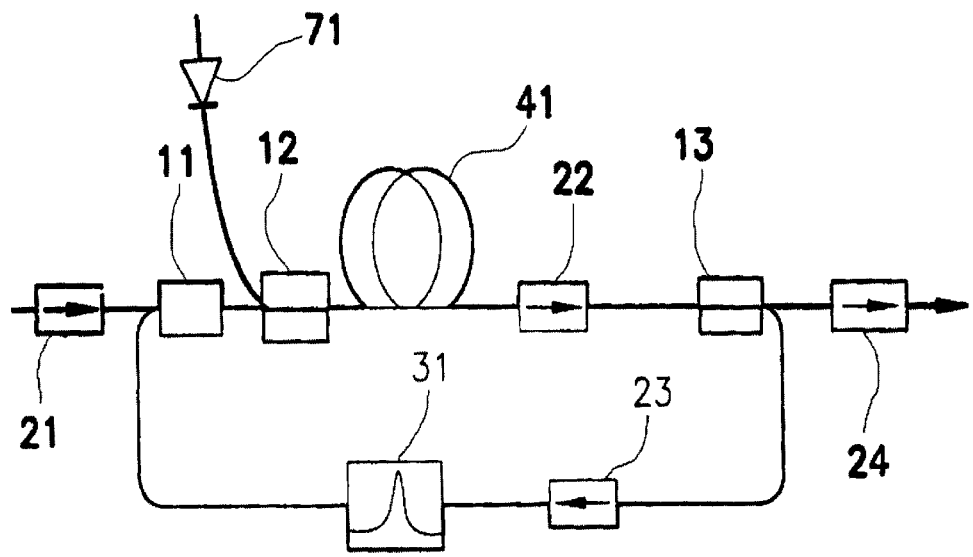
FIG. 1 is a block diagram showing an optical fiber amplifier for clamping gain of a prior art.
Figure 2:
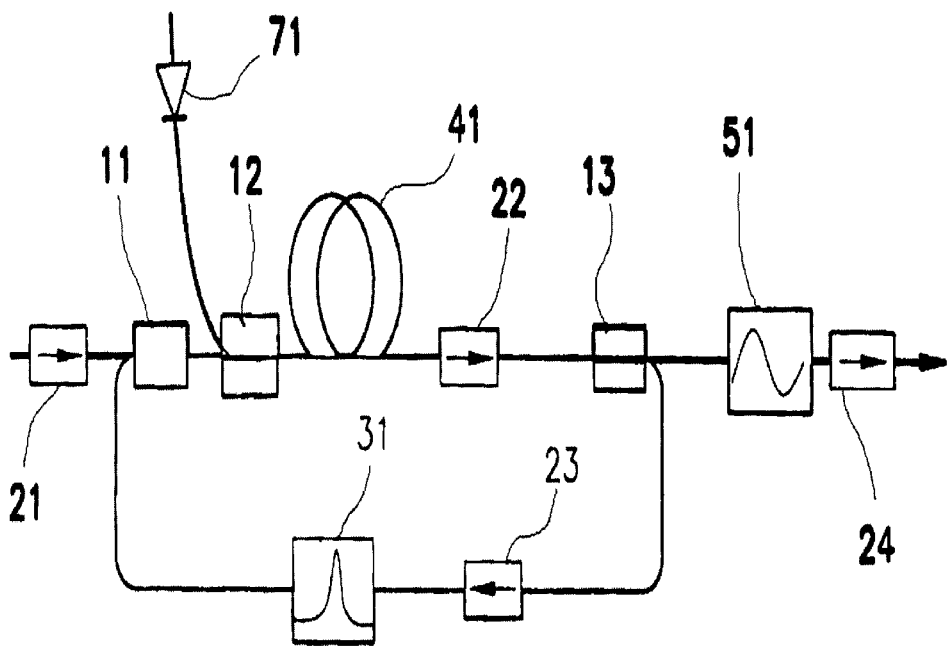
FIG. 2 is a block diagram showing an optical fiber amplifier of another example of a prior art that contains a gain equalizing filter after the optical fiber amplifier of FIG. 1.
Figure 3:
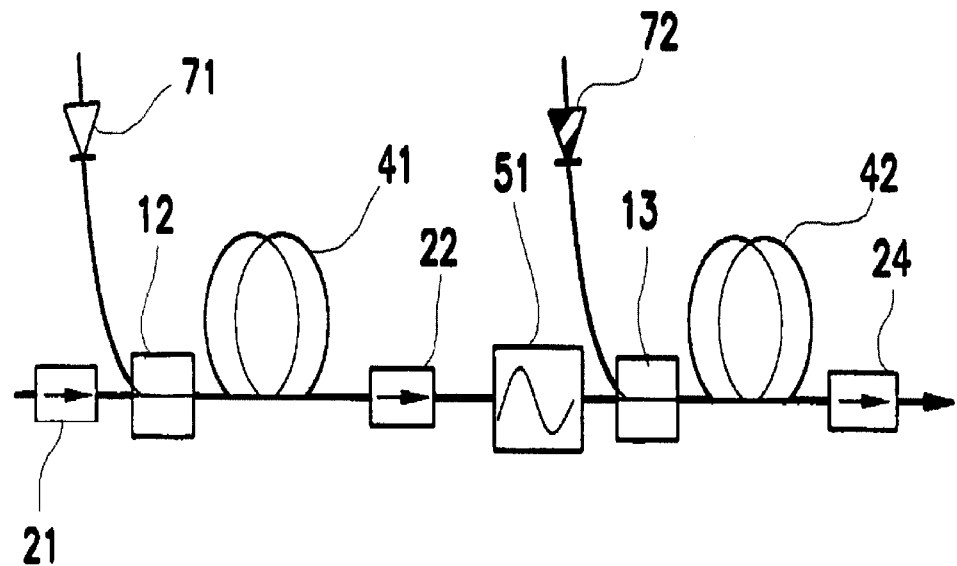
FIG. 3 is a block diagram showing a gain-flattened optical fiber amplifier of still another example of a prior art.
Figure 4:
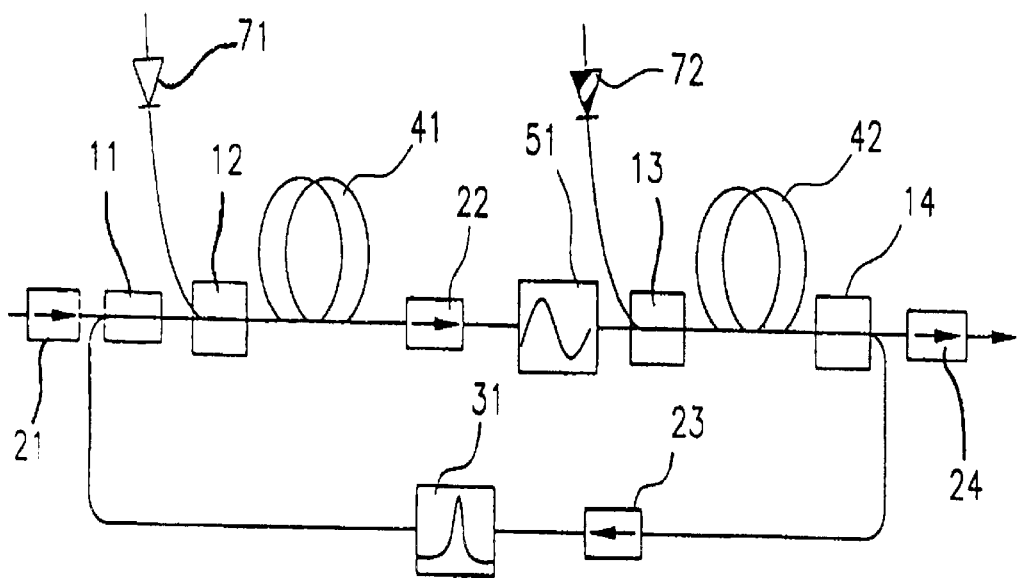
FIG. 4 is a block diagram showing an optical fiber amplifier for clamping and equalizing gain.

When such a construction is used, the schemes of both equalizing gain of FIG. 3 and gain clamping of FIG. 1, in various configurations, can be simultaneously utilized to make the optical fiber amplifier for clamping and equalizing gain with a wide gain band width and high output power.

Also, as shown in FIG. 6, a resonator made up of a pair of FBG 61, 62, clamps the gain of the input signal to the gain clamping amplifier unit 100 via the first coupler 11. When a compensating signal is applied to clamp the gain, the compensating signal may be applied directly by constituting a ring laser cavity or Fabry-Perot cavity with a pair of FBGs, as well as by an additional LD. As a result, the signal is inputted to the post-amplifier unit 200 via the gain equalizing filter 51, while the population inversion in the amplifying medium 41 is kept constant. The post-amplifier unit 200 can be pumped bi-directionally by using two optical couplers 12, 13 to obtain a high output power. Such a construction can be also used in either forward direction or backward direction.

Figure 7:
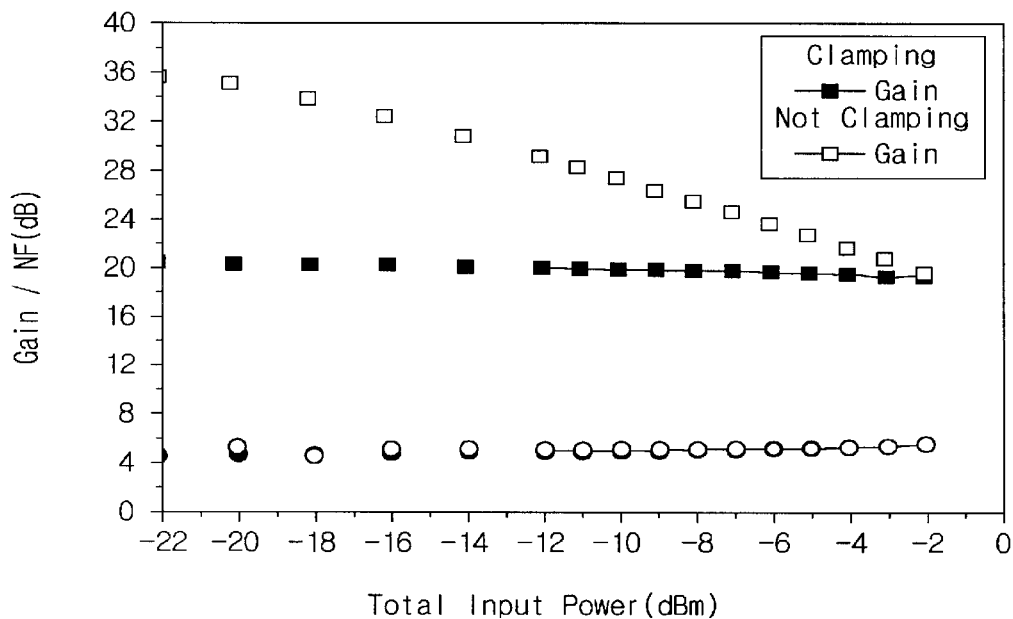
FIG. 7 is a graph showing a gain characteristic curve as a function of input signal power from the amplifier of FIG. 5.

FIG. 7 is a graph that shows characteristic curves as a function of the input signal power. A pumping power of 180 mW at 980 nm and EDF of 19 m and 11 m were used in the pre-stage and the post-stage, respectively and the feedback wavelength was 1560 nm. When 64 channels are used, the power of the whole input signals was −2 dBm and equivalent to −20 dBm for each channel.

When the gain clamping is not conducted, a small signal gain reaches 34 dB and the gain decreases as the signal power increases. This shows that the gain value changes as the input power varies, and that amplifier cannot be used in WDM network systems with frequent add/drops of channels.

When the gain clamping is conducted, the gain is clamped at 20 dB at a various input signal levels from −20 dBm to −2 dBm.

As a consequence, a constant gain of 20 dB can be obtained for a dynamic range of 18 dB, from −20 dBm to −2 dBm, that is at the variation from 1 channel to 64 channels.

In the case of EDFA, equalization of the gain is inevitable to use a wide gain band of more than 30 nm, since the gain value at 1530 nm is higher than those at other wavelengths.

Figure 8:
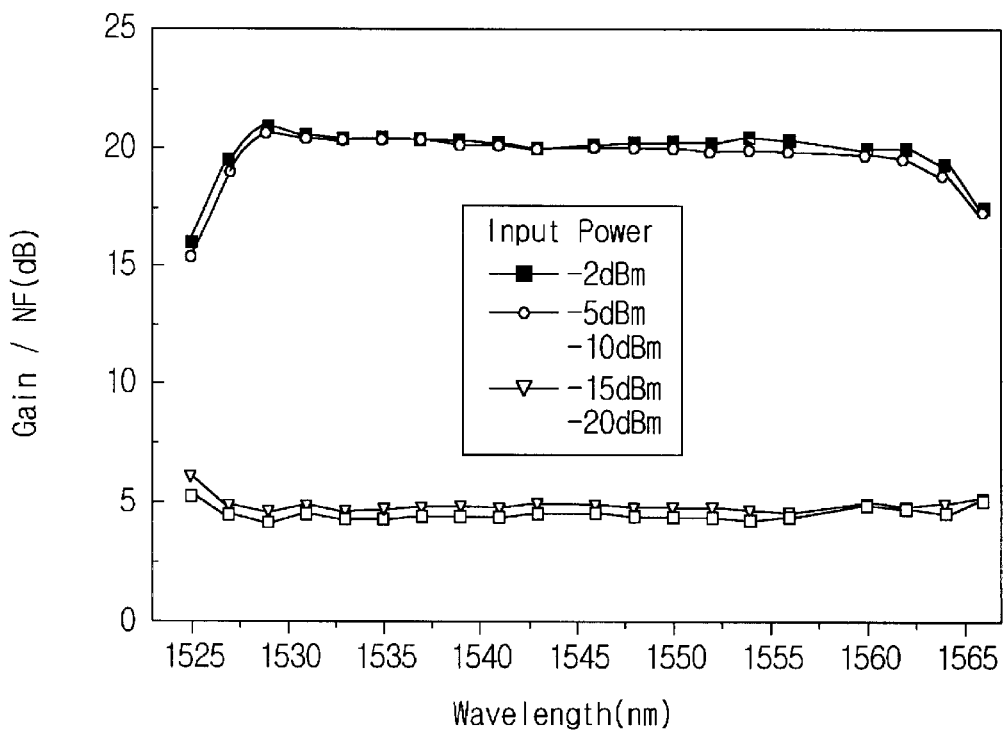
FIG. 8 is a graph showing a flattened and clamped gain spectrum in spite of the power variation of the input signal of FIG. 5.

FIG. 8 is a graph showing a flattened and clamped gain spectrum in spite of the power variation of the input signal of FIG. 5.

In the case of FIG. 8, the power of the input signal per channel is −20 dBm and the power that corresponds to 64 channels is −2 dBm. The gain clamping amplifier unit 100 uses a 980 nm pump of 160 mW, and the post-amplifier unit 200 uses a 980 nm pump of 180 mW. FIG. 8 shows the characteristics of the gain and the noise figure of the gain-clamped and gain-flattened optical fiber amplifier as a function of wavelength from the total input signal of −2 dBm, corresponding to 64 channels, to −20 dBm corresponding to a single channel.

It should be noted that the gain of the amplifier is constant at 20 dB over gain bandwidth of 30 nm at various input signal levels, that is, at various input channel numbers. The noise figure is less than 6 dB for the entire range of wavelength and input power. In addition, when two 1480 nm LDs are used to pump the gain medium 42 in both directions, the maximum output power of 21 dBm is achieved.

Accordingly, in FIG. 8, an equalized gain spectrum can be obtained over the bandwidth of more than 33 nm, from 1529 nm to 1562 nm.

As described above, the optical fiber amplifier for clamping and equalizing gain in optical communication systems of the present invention is very effective to provide a high output power, while clamping and equalizing the gain automatically by maintaining the population inversion in the EDF for high transmission capacity in WDM networks with add/drops of wavelength channels.

While the preferred embodiments of the present invention have been described herein referring to the drawings, it should be understood that other modifications, substitutions and alternatives may be apparent to one of ordinary skill in the art. Such modifications, substitutions and alternatives can be made without departing from the spirit and scope of the present invention. Accordingly, the above described does not limit the scope of the present invention, which should be determined from the appended claims.

What is claimed is:

1. An optical fiber amplifier for clamping and equalizing gain in optical communication systems comprising: a gain clamping amplifier unit for clamping the gain, so as to make input signals have the same output power for each channel by applying a compensating signal;

a second isolator for passing the input signal light from said gain clamping amplifier unit and isolating the light coming from the opposite direction;

a gain equalizing filter for equalizing the output gain spectrum from the input signal from said second isolator; and a post-amplifier unit for amplifying the signal from said gain equalizing filter.

2. The optical fiber amplifier for clamping and equalizing gain in optical communication system according to claim 1, said gain clamping amplifier unit inputs a compensating signal by a ring laser constructed by connecting both ends of an amplifying medium.

3. The optical fiber amplifier for clamping and equalizing gain in optical communication system according to claim 1, said gain clamping amplifier unit applies a compensating signal by constructing a laser resonator using fiber Bragg gratings.

4. The optical fiber amplifier for clamping and equalizing gain in optical communication system according to claim 1, said gain clamping amplifier unit applies a compensating signal by using an additional LD.

5. The optical fiber amplifier for clamping and equalizing gain in optical communication system according to claim 1, said gain clamping amplifier unit includes:

a first pump for producing the population inversion in an amplifying medium by inputting the pump power;

a first optical coupler for coupling said input signal and the output of said first pump;

a first amplifying medium for amplifying the input signal from said first optical coupler; and a laser resonator for producing a compensating signal and clamping the gain.

6. The optical fiber amplifier for clamping and equalizing gain in optical communication system according to claim 5, said gain clamping amplifier unit further includes a first isolator for passing the input signal light and isolating the light coming from the opposite direction.

7. The optical fiber amplifier for clamping and equalizing gain in optical communication system according to claim 1, said gain equalizing filter is designed by considering both characteristics of said gain clamping amplifier unit and post-amplifier unit.

8. The optical fiber amplifier for clamping and equalizing gain in optical communication system according to claim 1, said post-amplifier unit is pumped in the forward direction so that a high output can be obtained.

9. The optical fiber amplifier for clamping and equalizing gain in optical communication system according to claim 1, said post-amplifier unit is in the backward direction so that a high output can be obtained.

10. The optical fiber amplifier for clamping and equalizing gain in optical communication system according to claim 1, said post-amplifier unit is bi-directionally pumped so that a high output can be obtained.

11. The optical fiber amplifier for clamping and equalizing gain in optical communication system according to claim 1, said post-amplifier unit includes:

a second pump and a third pump for producing the population inversion in a second amplifying medium by increasing the pump power;

a second optical coupler for coupling the outputs of said gain equalizing filter and said second pump;

a second amplifying medium for amplifying the input signal from said second optical coupler; and a third optical coupler for coupling the outputs of said second amplifying medium and said third pump.

12. The optical fiber amplifier for clamping and equalizing gain in optical communication system according to claim 11, said post-amplifier unit further includes a third isolator for isolating the output of said third optical coupler and outputting the gain clamped and equalized signal.

* * * * *